(12) United States Patent
Rodger et al.

(10) Patent No.: US 10,778,063 B2
(45) Date of Patent: Sep. 15, 2020

(54) REDUCING BEARING FORCES IN AN ELECTRICAL MACHINE

(71) Applicants: David Rodger, Bath (GB); Hong Cheng Lai, Bath (GB)

(72) Inventors: David Rodger, Bath (GB); Hong Cheng Lai, Bath (GB)

( * ) Notice: Subject to any disclaimer, the term of this patent is extended or adjusted under 35 U.S.C. 154(b) by 832 days.

(21) Appl. No.: 14/901,480

(22) PCT Filed: Jul. 1, 2014

(86) PCT No.: PCT/GB2014/051993
§ 371 (c)(1),
(2) Date: Dec. 28, 2015

(87) PCT Pub. No.: WO2014/207455
PCT Pub. Date: Dec. 31, 2014

(65) Prior Publication Data
US 2016/0164371 A1 Jun. 9, 2016

(30) Foreign Application Priority Data
Jul. 2, 2013 (GB) .................................. 1311852.6

(51) Int. Cl.
*H02K 7/09* (2006.01)
*B60B 33/00* (2006.01)
(Continued)

(52) U.S. Cl.
CPC ........... *H02K 7/09* (2013.01); *B60B 33/0063* (2013.01); *B60B 33/0094* (2013.01);
(Continued)

(58) Field of Classification Search
CPC ......... H02K 1/2786; H02K 7/09; H02K 7/083
(Continued)

(56) References Cited

U.S. PATENT DOCUMENTS 5,856,719 A    1/1999   De Armas
5,928,131 A *   7/1999   Prem ................... F04D 13/0646
                                                         310/90.5
(Continued)

FOREIGN PATENT DOCUMENTS

CN       101409478 A     4/2009
CN       103026600 A     4/2013
(Continued)

OTHER PUBLICATIONS

Office Action for related Japanese Patent Application 2016-522873. OA dated Apr. 20, 2018. pp. 1-5.
(Continued)

*Primary Examiner* — Bernard Rojas
(74) *Attorney, Agent, or Firm* — Huffman Law Group, PC

(57) ABSTRACT

A magnetic drive has a prime mover, having a first magnet array on a first surface thereof, and a rotor, having a second magnet array on an outer surface thereof. The outer surface of the rotor is located adjacent to the first surface of the prime mover such that movement of the prime mover causes rotation of the rotor about an axis of rotation. A support member has a shaft for defining the axis of rotation of the rotor, and having a third magnet array, and the third magnet array cooperates with a fourth magnet array on the rotor to form a magnetic bearing to resist forces on the rotor acting along the axis of rotation thereof.

16 Claims, 17 Drawing Sheets

(51) Int. Cl.
*B60T 1/00* (2006.01)
*B62B 5/04* (2006.01)
*B60T 1/06* (2006.01)
*H02K 1/27* (2006.01)
*H02K 7/08* (2006.01)

(52) U.S. Cl.
CPC .............. *B60T 1/005* (2013.01); *B60T 1/062* (2013.01); *B62B 5/0404* (2013.01); *H02K 1/2786* (2013.01); *H02K 7/083* (2013.01); *B60B 33/0049* (2013.01); *B60B 2200/43* (2013.01); *B60Y 2200/83* (2013.01); *B60Y 2200/84* (2013.01); *B60Y 2200/86* (2013.01); *B62B 5/0414* (2013.01)

(58) Field of Classification Search
USPC ........................................................ 310/90.5
See application file for complete search history.

(56) References Cited

U.S. PATENT DOCUMENTS

| | | |
|---|---|---|
| 2004/0174079 A1 | 9/2004 | Izraelev |
| 2010/0231076 A1 | 9/2010 | Chiba et al. |
| 2011/0260564 A1 | 10/2011 | Rodger et al. |
| 2013/0033136 A1 | 2/2013 | McMullen |
| 2013/0126669 A1 | 5/2013 | Hamann et al. |
| 2014/0252899 A1* | 9/2014 | Looser ................ F16C 32/0402 310/90.5 |
| 2016/0006306 A1* | 1/2016 | Dumas .................. H02K 21/12 310/156.18 |
| 2017/0234364 A1* | 8/2017 | Sakawaki ........... F16C 32/0451 310/90.5 |

FOREIGN PATENT DOCUMENTS

| | | |
|---|---|---|
| GB | 2497591 A | 6/2013 |
| JP | H06-235420 | 8/1994 |
| JP | 2002130256 A | 5/2002 |

OTHER PUBLICATIONS

Rodger, D et al. EP Office Action. EP Application No. 14736928.4, dated Mar. 7, 2017. pp. 1-5.

Final Office Action issued by Japanese Patent Office (JPO) dated Jan. 18, 2019 for related foreign application JP2016-522873 filed on Jan. 31, 2015.

* cited by examiner

REDUCING BEARING FORCES IN AN ELECTRICAL MACHINE

This invention relates to reducing bearing forces in an electrical machine.

Electrical machines in the form of generators are very well known, in which a primary source of energy is used to rotate a body, and this rotor cooperates with a stator to produce an electric current. However, where the primary source of energy is one of the common sources of renewable energy, such as wind, tide, or wave, the rotor typically moves rather slowly, at least compared with the 3000 rpm achieved in a conventional power station.

A recent patent application (EP-A-2335344) describes machines which have an integrated magnetic gearing system which converts the slow rotation of a prime mover into faster rotation of a rotor in a generator. Double-sided arrays of magnets are employed to produce a very torque dense magnetic gearing system which results in a smaller machine.

However, in some cases a high torque density is not necessary. A later patent application (PCT/GB2012/053143) describes machines which use one array of magnets co-operating with an array of salient ferromagnetic poles to produce a gearing effect. In some applications, this could be less expensive and more robust than the previous double-sided magnet system. Both of these previously described sets of machines can be operated as motors or generators.

For convenience these previous machines are here referred to as Double Sided Magnet (DSM) or Magnet Reluctance (MR) machines respectively.

In common with many other electrical machines, these new machines include spinning rotors and bearings are required to carry them. Conventional mechanical rolling or plain bearings, magnetic bearings or fluid bearings can be used. The bearing forces can be high in both of these previously described sets of machines.

High bearing forces are disadvantageous to conventional bearings in many ways, for instance higher initial cost and mass, reduced length of service, higher noise and lower efficiency.

In the case of active magnetic bearings, electrical power is supplied to coils which produce a magnetic field which is used to control the position of the spinning rotor. Larger bearing forces here give rise to more power, larger electro-magnets and lower efficiency.

According to one aspect of the invention, there is provided a magnetic drive, comprising:

a prime mover, having a first magnet array on a first surface thereof;

a rotor, having a second magnet array on an outer surface thereof, the outer surface of the rotor being located adjacent to the first surface of the prime mover such that movement of the prime mover causes rotation of the rotor about an axis of rotation;

a support member, having a shaft for defining the axis of rotation of the rotor, and having a third magnet array, wherein the third magnet array cooperates with a fourth magnet array on the rotor to form a magnetic bearing to resist forces on the rotor acting along the axis of rotation thereof.

Thus, it is described how bearing forces in the DSM and MR machines may be reduced.

For a better understanding of the present invention, and to show how it can be put into effect, reference will now be made, by way of example, to the accompanying drawings, in which:—

Figure 1:
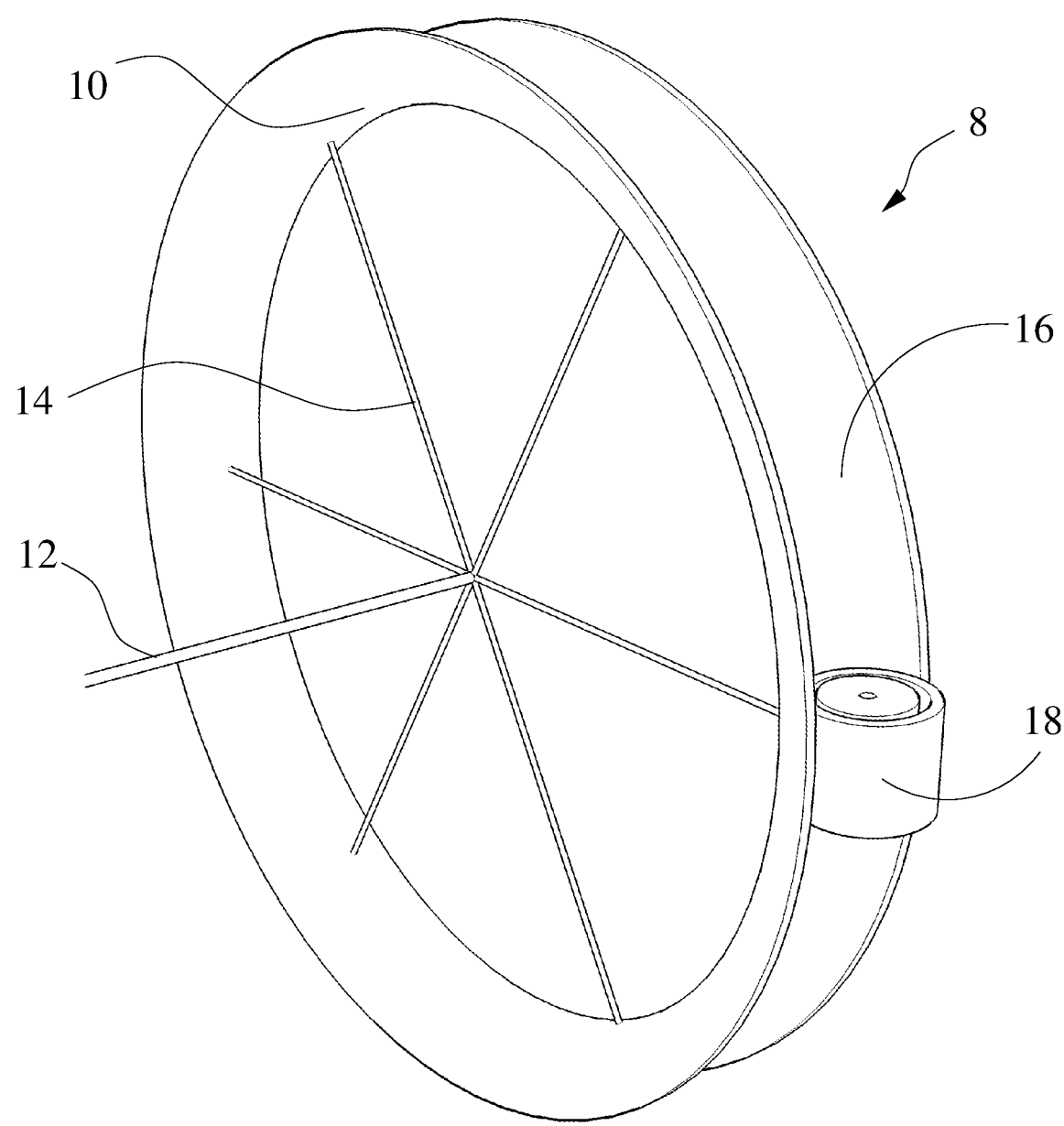
FIG. 1 is a schematic diagram, illustrating a part of a machine in accordance with the previous inventions.

FIG. 1 shows the general structure of an electrical machine 8 in accordance with the previous two patent applications (EP-A-2335344 and PCT/GB2012/053143). The electrical machine is described herein in the form of a generator, in which a rotation of a body is used to generate electrical power. However, it will be appreciated by the person skilled in the art that the same principle can be used to construct a motor, in which electrical power is applied, and used to cause a body to rotate.

The machine 8 of FIG. 1 has a first rotor 10, which is connected to an axle 12 by a support structure shown here in the form of spokes 14. Rotation of the axle 12 then causes the rotor 10 to rotate about the axis defined by the axle. The rotation of the axle 12 can be driven by a power source such as a wind turbine, a tidal current machine, or a wave energy converter, and although it can of course be driven by any power source, the machine of the present invention is particularly suitable for situations where the driving rotation is at a relatively low speed, for example at about 20 rpm for the case of a typical 1.5MW wind turbine. In addition, although FIG. 1 shows the rotor 10 being driven through the axle 12, it can be driven directly by a body that is being caused to rotate by the external power source.

The rotor 10 is generally toroidal. That is, it has an annular shape, which can be generated by rotating a circle about an axis that lies in the plane of the circle but outside the circle. This axis is then the axis about which the rotor is caused to rotate.

However, the surface of the rotor is not a complete torus. Specifically, the part of the circular cross-section that lies furthest away from the axis of rotation is omitted, leaving an annular gap 16.

Visible through the gap 16 in FIG. 1 is a cylindrical second rotor 18, which has an outer circular cross-section that is slightly smaller than the inner circular cross-section of the rotor 10.

Although FIG. 1 shows only one cylindrical second rotor 8, many such second rotors can in fact be located within the first rotor.

Figure 2:
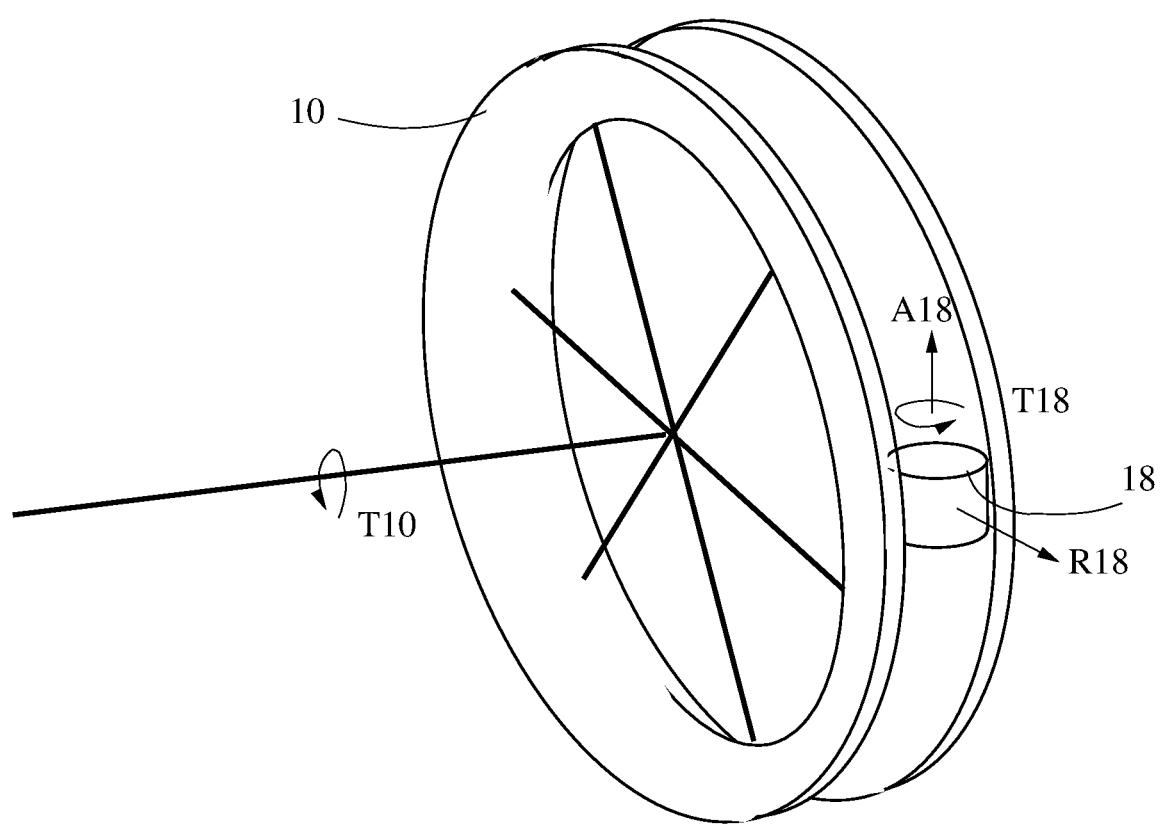
FIG. 2 is a schematic diagram, illustrating a part of a machine in accordance with the previous inventions, showing the main forces and torques.

FIG. 2 is a schematic view of both the DSM and MR machines.

As described in the previous DSM application (EP-A-2335344) helical arrangements of magnets on the facing surfaces of the rotor 10 and the second rotor 18 can be provided such that a torque T10 applied to rotor 10 will give rise to a resultant torque T18 on rotor 18 and vice versa.

In the previous MR application (PCT/GB2012/053143) a helical arrangement of magnets and salient poles of ferromagnetic material on the facing surfaces of the rotor 10 and the second rotor 18 can be provided such that a torque T10 applied to rotor 10 will give rise to a resultant torque T18 on rotor 18 and vice versa. The magnets can be arranged on the surface of rotor 10, while salient poles are provided on the surface of rotor 18. Alternatively, the salient poles can be arranged on the surface of rotor 10, while magnets are provided on the surface of rotor 18.

In both the DSM and MR systems, as well as the desired torque being produced, there are also some undesirable forces present in the system. It is one purpose of the present invention to reduce the levels of the undesirable forces.

FIG. 2 shows the radial force on rotor 18 labelled R18. This force acts mainly along a normal to the common surface of rotors 10 and 18 and will have a resultant mainly in the radial direction of rotor 18 shown as R18. This force causes an undesirable radial load on bearings which support rotor 18. If R18 is considered to be larger than convenient, it may be rendered negligible by exploiting cancellation of the radial forces when more than one toroidal rotor 10 is used. Systems using two toxoid sections have been described previously in (EP-A-2335344 and PCT/GB2012/053143) and are illustrated again here for convenience in FIG. 3 and FIG. 4.

Figure 3:
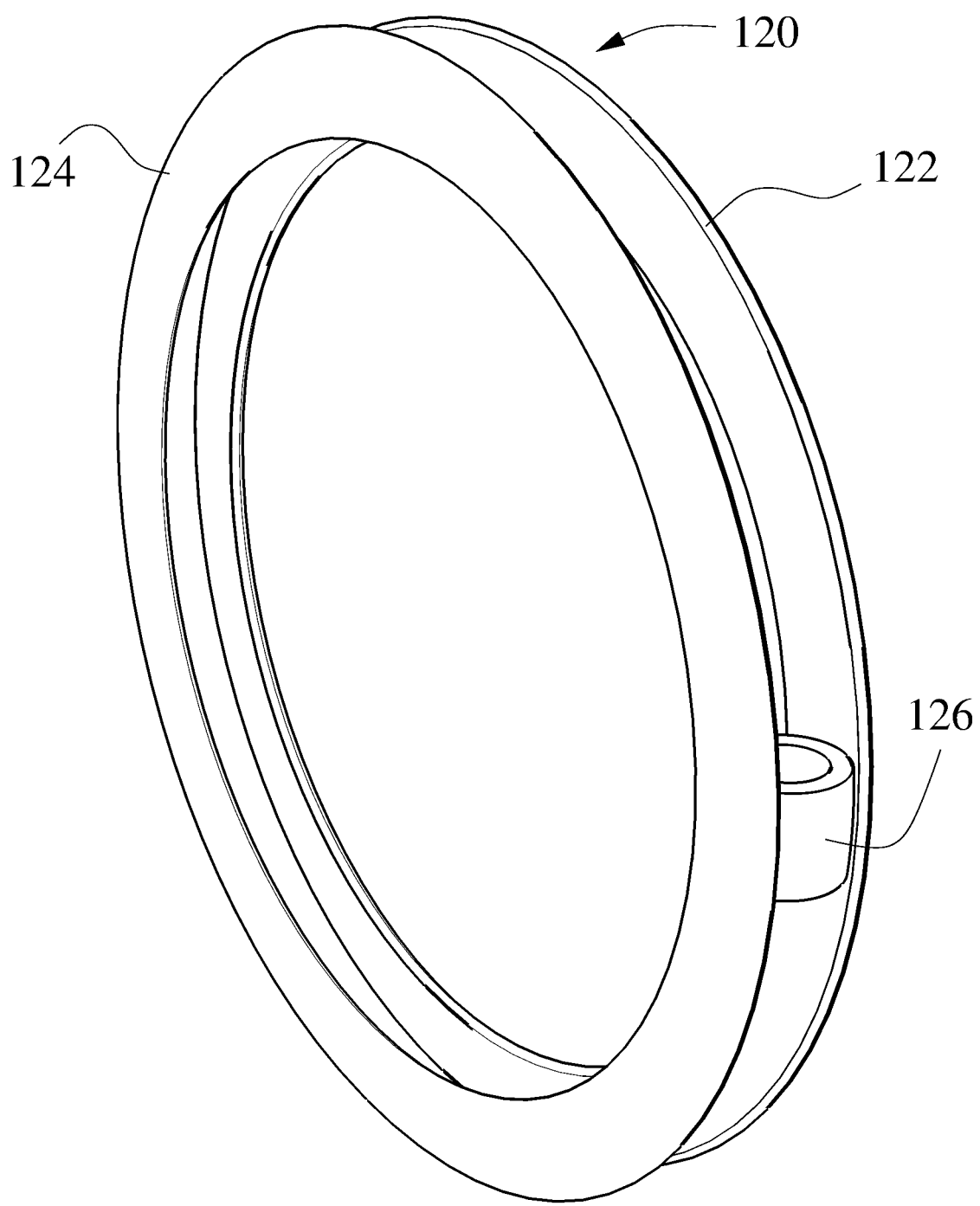
FIG. 3 is a schematic diagram, illustrating how the radial bearing forces may be substantially reduced by an alternative arrangement of the first and second rotors.

In the case of both the DSM and MR machines 120 illustrated in FIG. 3, if the rotor 126 is spaced an equal distance between the two toroidal section rotors 122 and 124, the resultant radial forces on the rotor 126 will be in substantially opposite directions and will substantially cancel.

Figure 4:
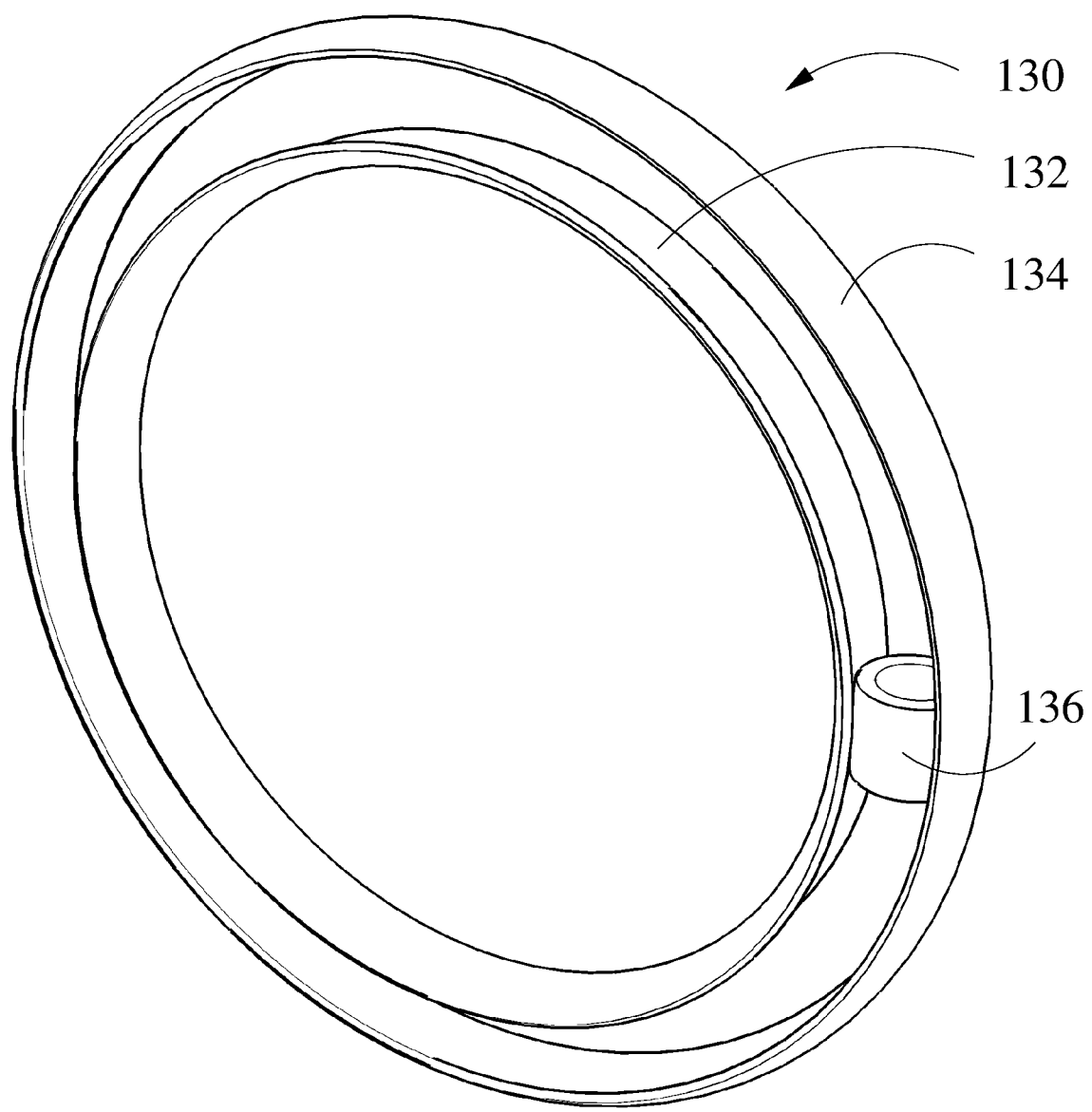
FIG. 4 is a schematic diagram, illustrating how the radial bearing forces may be substantially reduced by a second alternative arrangement of the first and second rotors.

In the case of both the DSM and MR machines 130 illustrated in FIG. 4, if the rotor 136 is spaced an optimal distance between the two toroidal section rotors 132 and 134, the resultant radial forces on the rotor 136 will be substantially in opposite directions and will substantially cancel.

FIG. 2 shows the axial force on rotor 18 labelled as A18. This force acts mainly along the axis of the rotor 18. This undesirable force is directly related to the required torque T18, so cannot be cancelled out as in the case of R18. The axial force on rotor 18 can be calculated approximately as:

$$A18 = T18 * revs18 / (R10 * revs10)$$

Where revs18 and revs10 are the revolutions per minute of rotor 18 and rotor 10 respectively and R10 is the perpendicular distance between the axes of rotors 10 and 18.

As an example, using the DSM system to design a compact generator for a 10MW wind turbine, with a multiplicity of rotors 18, typical values are as follows:
revs10=10 rpm
revs18=3000 rpm
T18=1000 Nm
R10=2 m
So A18=150 kN or 15 tonnes It will be appreciated that the force A18 can easily be reduced, but only at the expense of a less compact generator.

Conventionally, the force A18 would be carried by mechanical bearings, which could consist of combined thrust and axial force bearings, or by a set of bearings, some of which carry the radial forces and some of which carry the thrust forces, or by a mixture of several types of bearings.

This invention concerns a system of magnets arranged so as to counteract some or all of the axial force A18. For the purpose of illustration only, FIGS. 5a and 5b each show a cross section through the rotor 18 (or the rotor 126 in the embodiment of FIG. 3 or the rotor 136 in the embodiment of FIG. 4). The invention however allows other similar arrangements. Shaft 501 provides the axis of rotation of the rotor 18, and is constrained to be stationary by a support structure not shown here. A stationary flange 502 is joined to shaft 501.

The magnet support structure 503 rotates on the shaft 501 carried on bearings 505. The helical magnets (in the case of the DSM structure described above) or helical salient poles (in the case of the MR structure) are provided on the surface 504, arranged on the outside diameter of the rotating body 503.

Mounted on the flange 502 are the magnetic thrust bearings, which are described in more detail below. The bearings 505, which may be any previously described bearings such as mechanical rolling element bearings, mechanical plain bearings, active magnetic bearings or fluid bearings are arranged so as to allow a small amount of movement in the axial direction of rotor 18, but so as to constrain the structure 503 within industrially acceptable tolerances in other directions. The axial force A18 acts on the support structure 503 as a result of electromagnetic interactions between the magnetic structure 504 and the corresponding magnetic arrangement on the torpid 10, as previously described in patent applications (EP-A-2335344 and PCT/GB2012/053143).

The space 508 defined by the magnet support structure 503 contains the internal electric motor or generator as previously described (EP-A-2335344 and PCT/GB2012/053143).

Some or all of the axial force A18 appears across the magnetic thrust bearings.

Figure 5A:
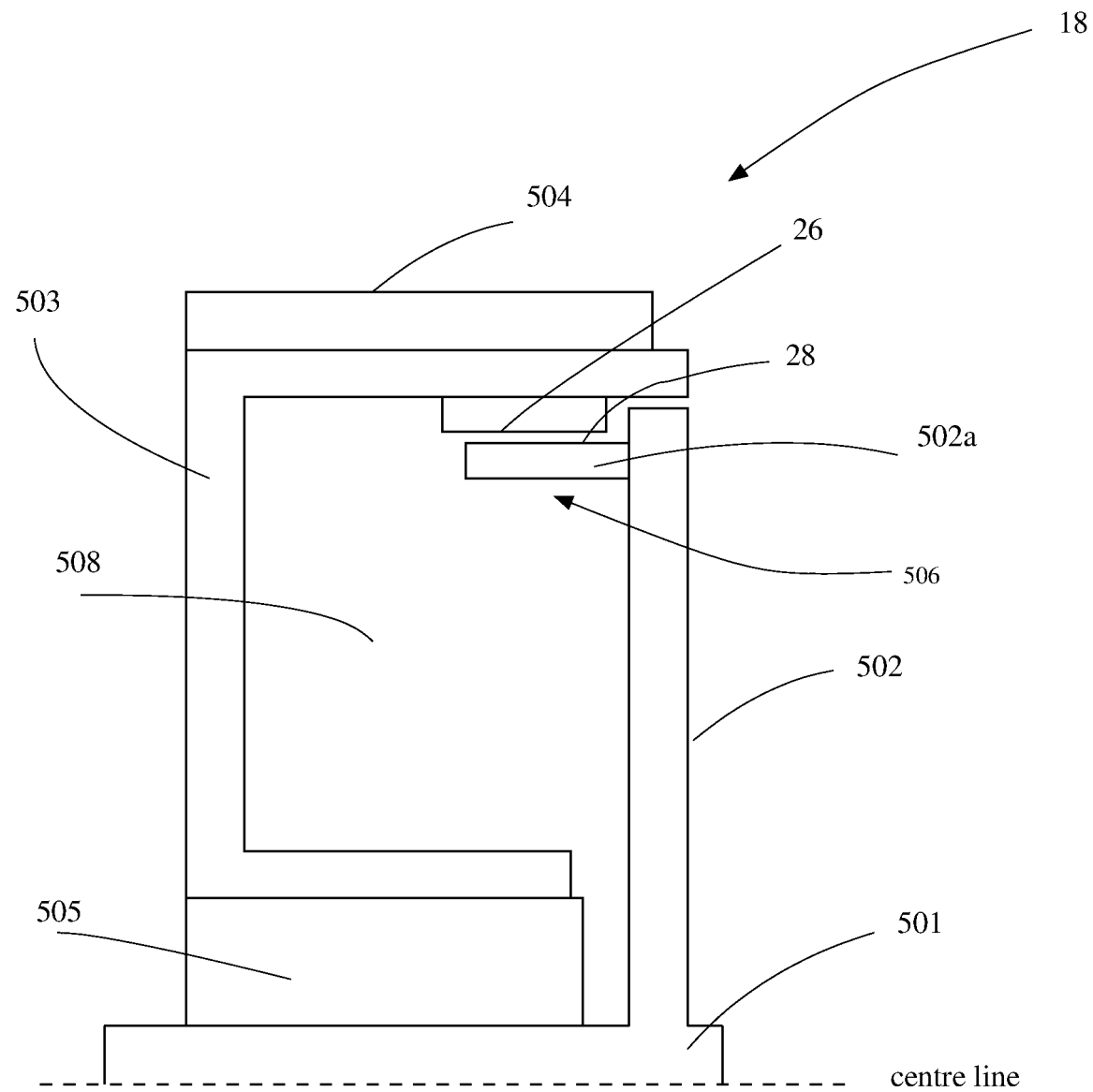
FIGS. 5a and 5b are cross-sectional views through a rotor of the machine shown in FIG. 1, FIG. 3 or FIG. 4.

FIG. 5a shows an embodiment in which the magnetic thrust bearings 506 comprise a first magnetic surface 26 provided on a radially inwards facing surface of the magnet support structure 503 and a second magnetic surface 28 provided on a radially outwards facing surface of a protrusion 502a from the flange 502. The magnetic thrust bearings 506 in FIG. 5a are therefore provided at a radially outer region of the space 508.

Figure 5B:
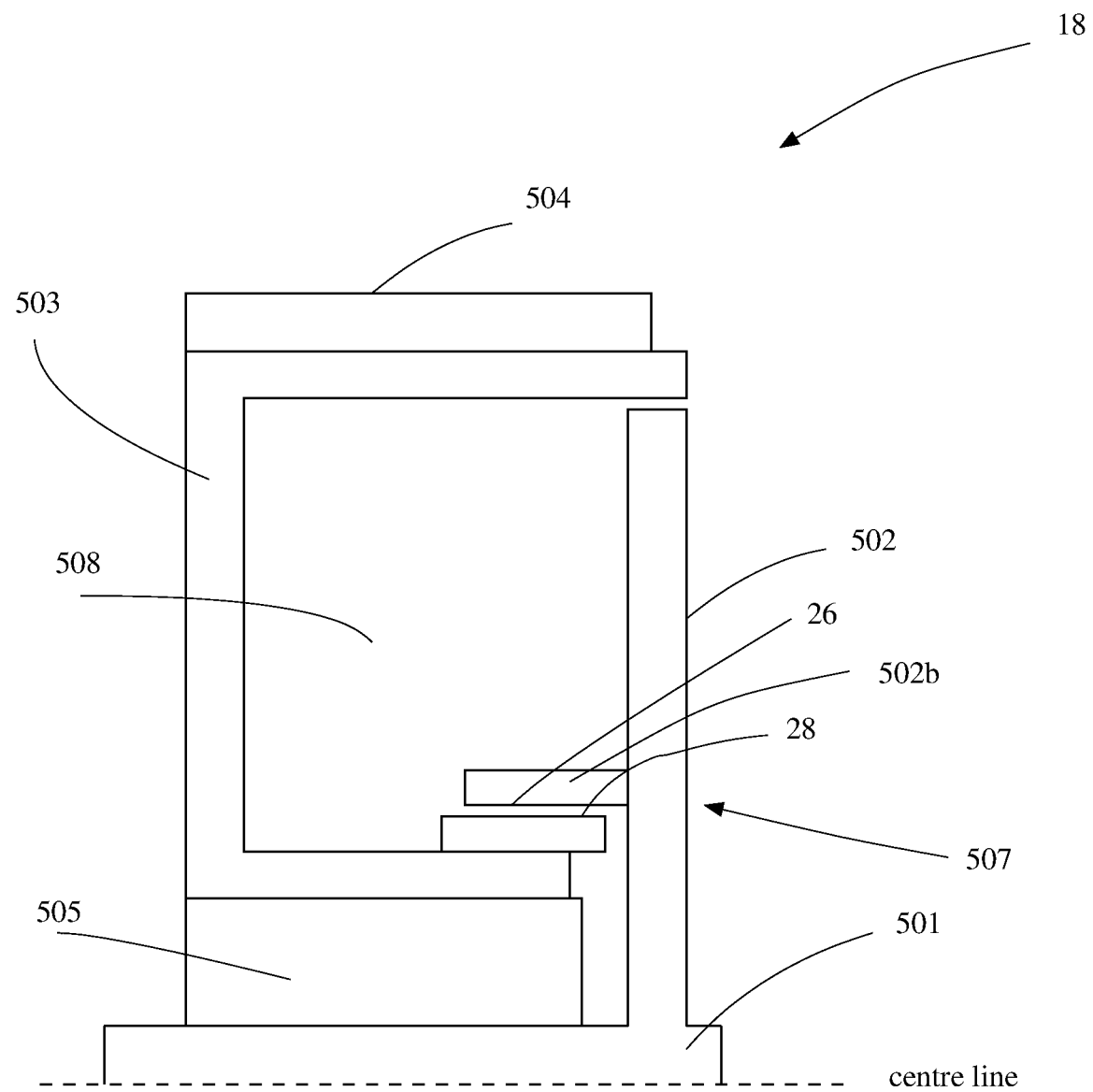

FIG. 5b shows an embodiment in which the magnetic thrust bearings 507 comprise a first magnetic surface 26 provided on a radially inwards facing surface of a protrusion 502b from the flange 502 and a second magnetic surface 28 provided on a radially outwards facing surface of the magnet support structure 503. The magnetic thrust bearings 507 in FIG. 5b are therefore provided at a radially inner region of the space 508.

In other embodiments, magnetic thrust bearings can be provided at both of the positions shown in FIGS. 5a and 5b, and/or at one or more positions intermediate between those shown in FIGS. 5a and 5b.

The effect of the magnetic thrust bearings is to reduce or remove substantially all of the axial force on the bearings 505.

In many applications of either the DSM or MR system, the force A18 could be aligned along both possible directions and could be of an unknown magnitude. For instance in a wind turbine the direction and force of the wind varies. The magnitude of A18 will, however, under normal operating conditions, always lie between certain limits. These limits are determined by the maximum achievable shear force between the magnetic structure 504 and the corresponding magnetic arrangement on the toroid 10. This means that it is possible to calculate exactly how much thrust is required from the magnetic thrust bearings 506 or 507. If it is arranged that the maximum shear force capability of the thrust bearings 506 or 507 is greater than that resulting from the maximum achievable shear force between the magnetic structure 504 and the corresponding magnetic arrangement on the toroid 10, then the bearings 506 or 507 will always be able to withstand all forces resulting from any operating conditions. This is advantageous because, in the case of an event which causes a torque T10 which exceeds the torque capability of the machine, the magnetic surface of 504 will slip past the surface of rotor 10 without damage before any out of range displacement of bearing 506 or 507 can occur.

In the case of bearings 506 positioned as shown in FIG. 5a, the magnetic thrust bearing comprises an inner surface 26 attached to the spinning support structure 503 and an outer surface 28 attached to the stationary part 502. In the case of bearings 507 positioned as shown in FIG. 5b, the magnetic thrust bearing comprises an inner surface 26 attached to the stationary part 502 and an outer surface 28 attached to the spinning support structure 503. In either case, provided on surfaces 26 and 28 are arrangements of magnets and/or salient poles configured so that the spinning support structure 503 can rotate about the stationary axis 501 easily, but can move in the axial direction of rotor 18 only within small limits determined by design.

Figure 6:
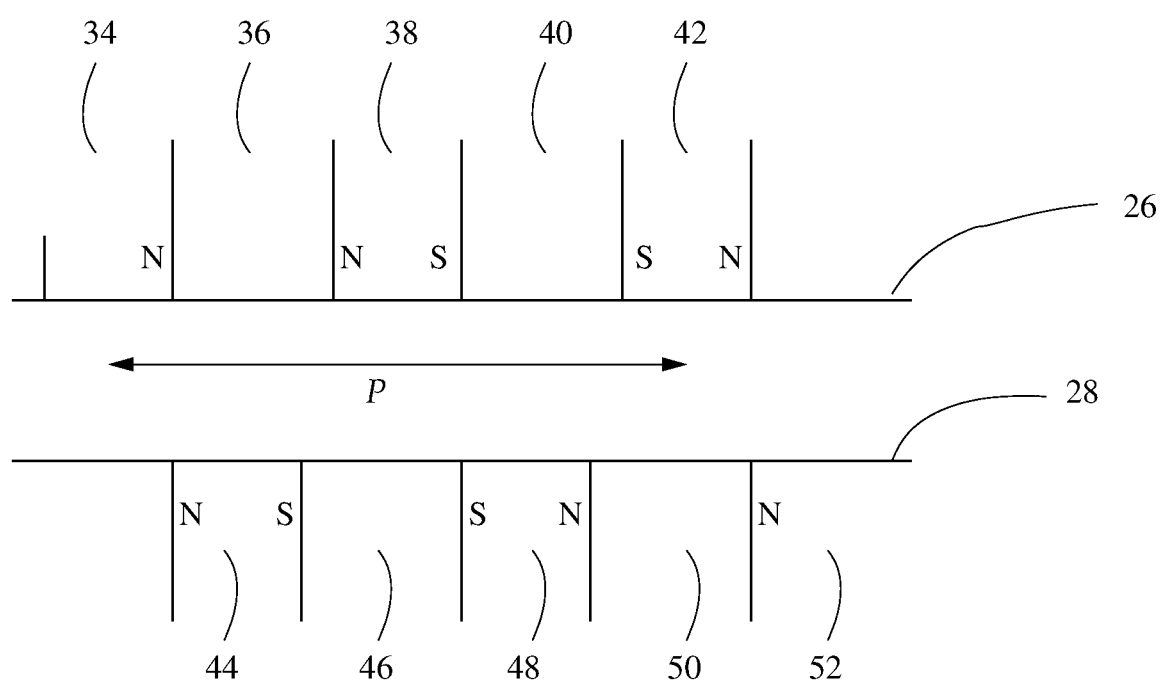
FIG. 6 shows a first arrangement of magnets on the first and second bearing surfaces in the machine of FIG. 5.

FIG. 6 shows a first possible arrangement of magnets on the surfaces 26, 28 of the first and second bearing surfaces. It will be apparent that the arrangements are the same, but are displaced from each other. In addition, it will be noted that the arrangements are shown here schematically as if the two surfaces are planar, rather than circular. The illustrated section of the surface 26 has a first magnet 34, made from permanent magnet material magnetized in a first direction, then a piece of iron 36, then a second magnet 38, made from permanent magnet material magnetized in a second direction opposite to the first direction, then a second piece of iron 40, then a third magnet 42, made from permanent magnet material magnetized in the first direction.

The illustrated section of the surface 28 has a first magnet 44, made from permanent magnet material magnetized in the second direction, then a piece of iron 46, then a second magnet 48, made from permanent magnet material magnetized in the first direction, then a second piece of iron 50, then a third magnet 52, made from permanent magnet material magnetized in the second direction.

In this case, the arrangement of magnets on the surfaces 26, 28 has a pitch P equal to the width of two of the magnets plus two of the pieces of iron, as shown in FIG. 6.

Figure 7:
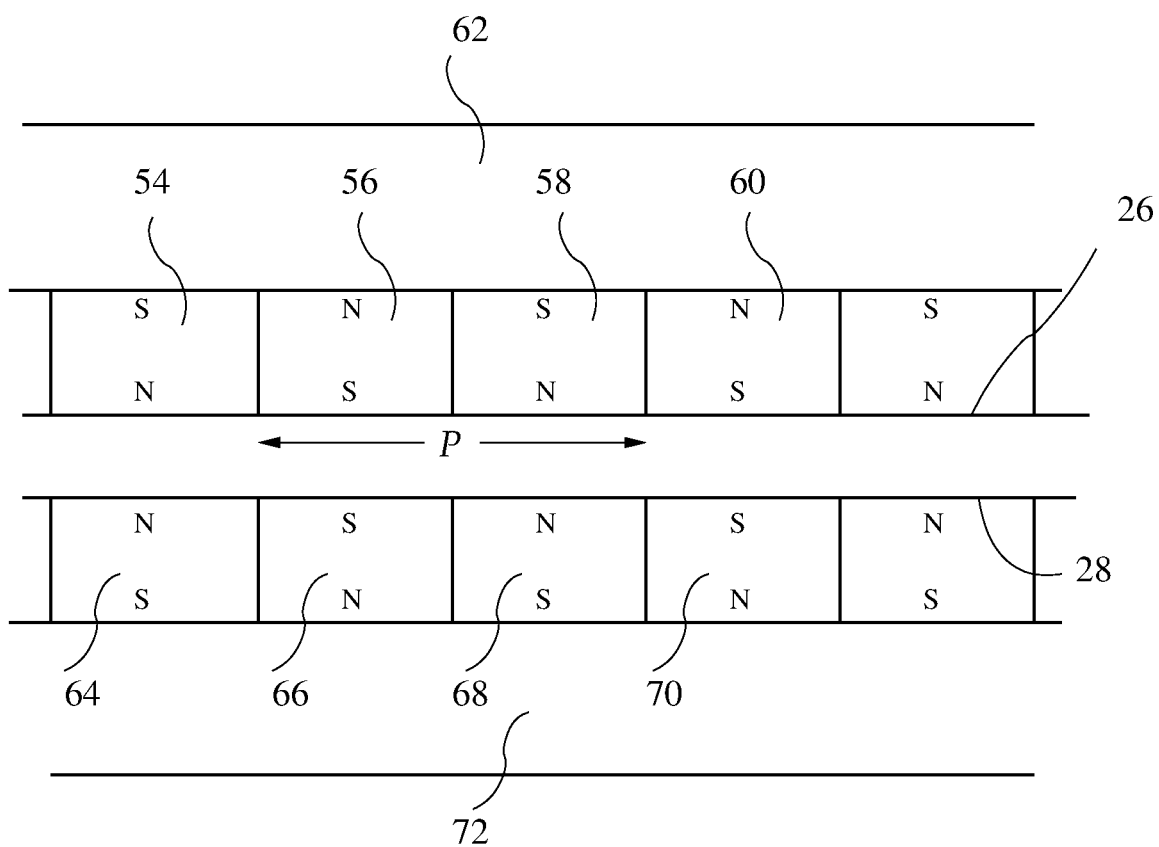
FIG. 7 shows a second alternative arrangement of magnets on the first and second bearing surfaces in the machine of FIG. 5.

FIG. 7 shows a second possible arrangement of magnets on the surfaces 26, 28 of the first and second bearing surfaces. Again, it will be apparent that the arrangements are the same, but are displaced from each other, and it will be noted that the arrangements are shown here schematically as if the two surfaces are planar, rather than circular.

In FIG. 7, the illustrated section of the surface 26 has a first magnet 54, made from permanent magnet material magnetized in a first direction, then a second magnet 56, made from permanent magnet material magnetized in a second direction opposite to the first direction, then a third magnet 58, made from permanent magnet material magnetized in the first direction, then a fourth magnet 60, made from permanent magnet material magnetized in the second direction, and so on. A piece of ferromagnetic material, for example iron, 62 is connected to one end of each of these magnets 54, 56, 58, 60.

The illustrated section of the surface 28 has a first magnet 64, made from permanent magnet material magnetized in the second direction, then a second magnet 66, made from permanent magnet material magnetized in the first direction, then a third magnet 68, made from permanent magnet material magnetized in the second direction, then a fourth magnet 70, made from permanent magnet material magnetized in the first direction, and so on. A piece of ferromagnetic material, for example iron, 72 is connected to one end of each of these magnets 64, 66, 68, 70.

In this case, the arrangement of magnets on the surfaces 26, 28 has a pitch P equal to the width of two of the magnets as shown in FIG. 7.

Figure 8:
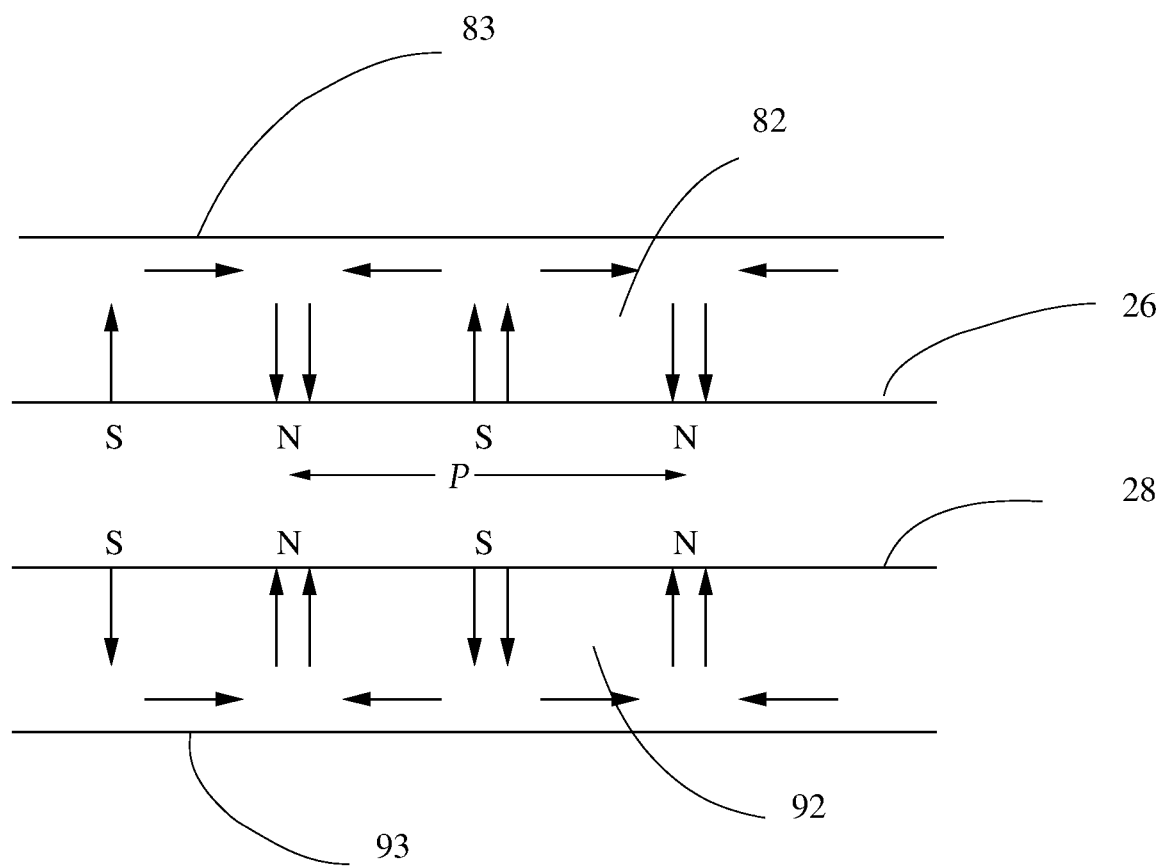
FIG. 8 shows a third alternative arrangement of magnets on the first and second bearing surfaces in the machine of FIG. 5.

FIG. 8 shows a third possible arrangement of magnets on the surfaces 26, 28 of the first and second bearing surfaces. Again, it will be apparent that the arrangements are the same, but are displaced from each other, and it will be noted that the arrangements are shown here schematically as if the two surfaces are planar, rather than circular.

In FIG. 8, the illustrated section of the surface 26 has permanent magnet material 82 magnetized in such a way as to produce a succession of North and South poles at the surface 26 as shown and very little magnetic field on the opposite surface 83, in an arrangement known as a Halbach array to a person skilled in the art.

The illustrated section of surface 28 has permanent magnet material 92 magnetized in such a way as to produce a succession of magnetic North and South poles at the surface 28 as shown and very little magnetic field on the surface 93, again forming a Halbach array.

Again, the arrangement of magnets on the surfaces 26, 28 has a pitch P equal to the distance between two successive North poles, or between two successive South poles, as shown in FIG. 8.

Whether the magnets are as shown in FIG. 6, or as shown in FIG. 7, or as shown in FIG. 8, they produce a degree of coupling between the surfaces 26 and 28. It is also possible to use an arrangement of magnets which is based on a mixture of the schemes outlined in FIGS. 6, 7 and 8. For instance a machine could be designed based on the magnets at surface 28 of FIG. 8 co-operating with the magnets shown at surface 26 of FIG. 7.

It is also possible to produce the magnetic field at surfaces 26 or 28 by using conventional electrical machine windings.

If conventional electrical machine windings are used, it is readily possible for a person skilled in the art to create an actively controlled bearing in which the forces between the parts are varied by varying the current in the windings as required.

Figure 9:
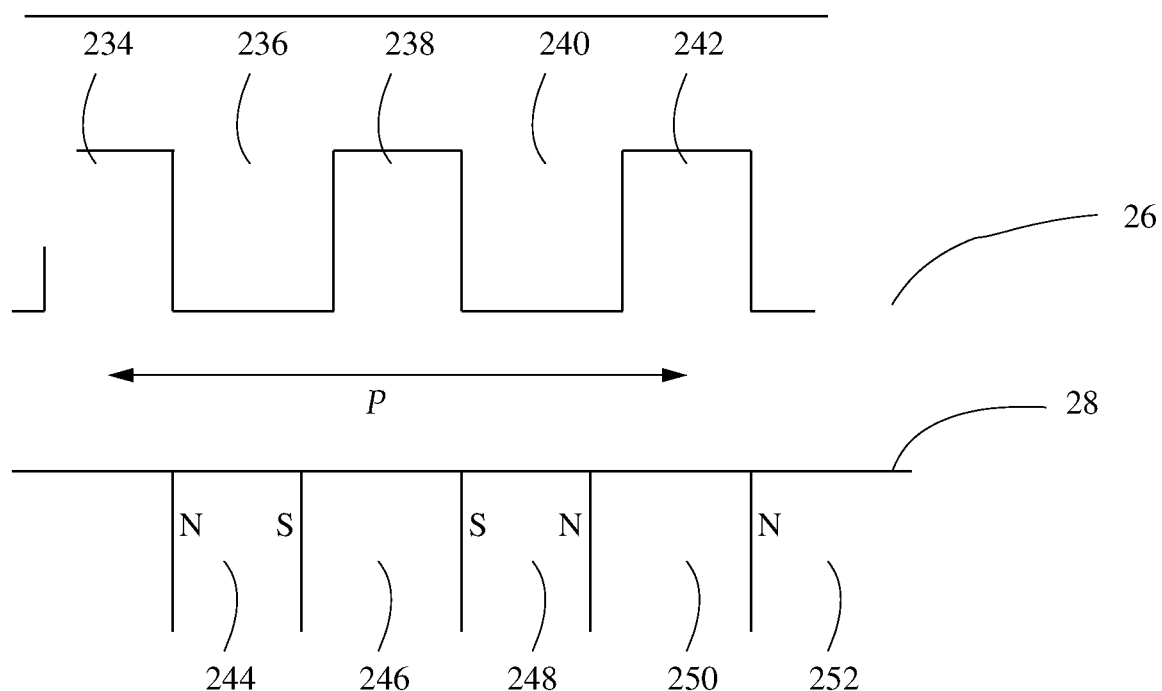
FIG. 9 shows a first arrangement of ferromagnetic salient poles and magnets on the first and second bearing surfaces in the machine of FIG. 5.

FIG. 9 shows a first possible arrangement of ferromagnetic salient poles and magnets on the surfaces 26, 28 of the first and second bearing surfaces. It will be apparent that the arrangements are shown here schematically as if the two surfaces are planar, rather than circular. The illustrated section of the surface 26 has ferromagnetic salient poles 236, 240 as shown. Between the poles are non ferromagnetic slots 234, 238, 242.

The illustrated section of the surface 28 has a first magnet 244, made from permanent magnet material magnetized in the second direction, then a piece of iron 246, then a second magnet 248, made from permanent magnet material magnetized in the first direction, then a second piece of iron 250, then a third magnet 252, made from permanent magnet material magnetized in the second direction.

In this case, the arrangement of ferromagnetic salient poles and magnets on the surfaces 26, 28 has a pitch P equal to the width of two of the magnets plus two of the pieces of iron 246, as shown in FIG. 9.

Figure 10:
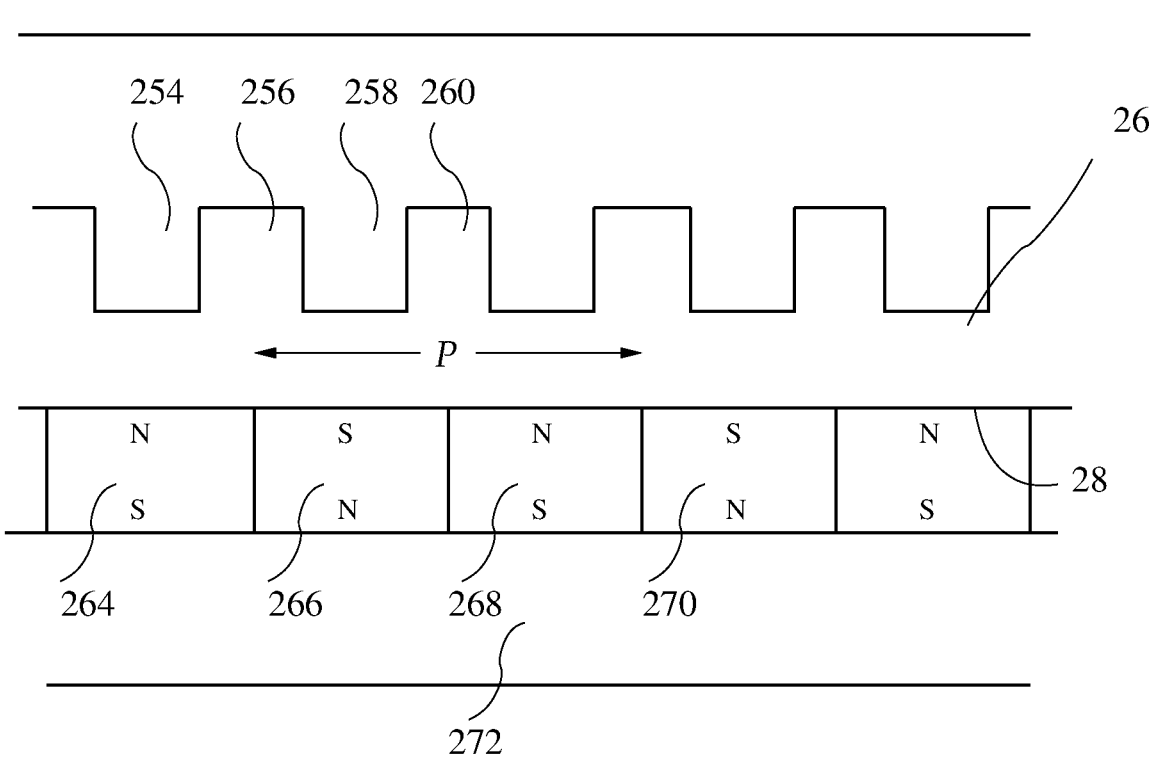
FIG. 10 shows a second alternative arrangement of ferromagnetic salient poles and magnets on the first and second bearing surfaces in the machine of FIG. 5.

FIG. 10 shows a second possible arrangement of ferromagnetic salient poles and magnets on the surfaces 26, 28 of the first and second bearing surfaces. Again, it will be apparent that the arrangements are shown here schematically as if the two surfaces are planar, rather than circular.

In FIG. 10, the illustrated section of the surface 26 has ferromagnetic salient poles as shown at 254 and 258. Between the poles are non ferromagnetic slots 256 and 260.

The illustrated section of the surface 28 has a first magnet 264, made from permanent magnet material magnetized in the second direction, then a second magnet 266, made from permanent magnet material magnetized in the first direction, then a third magnet 268, made from permanent magnet material magnetized in the second direction, then a fourth magnet 270, made from permanent magnet material magnetized in the first direction, and so on. A piece of ferromagnetic material, for example iron, 272 is connected to one end of each of these magnets 264, 266, 268, 270.

Figure 11:
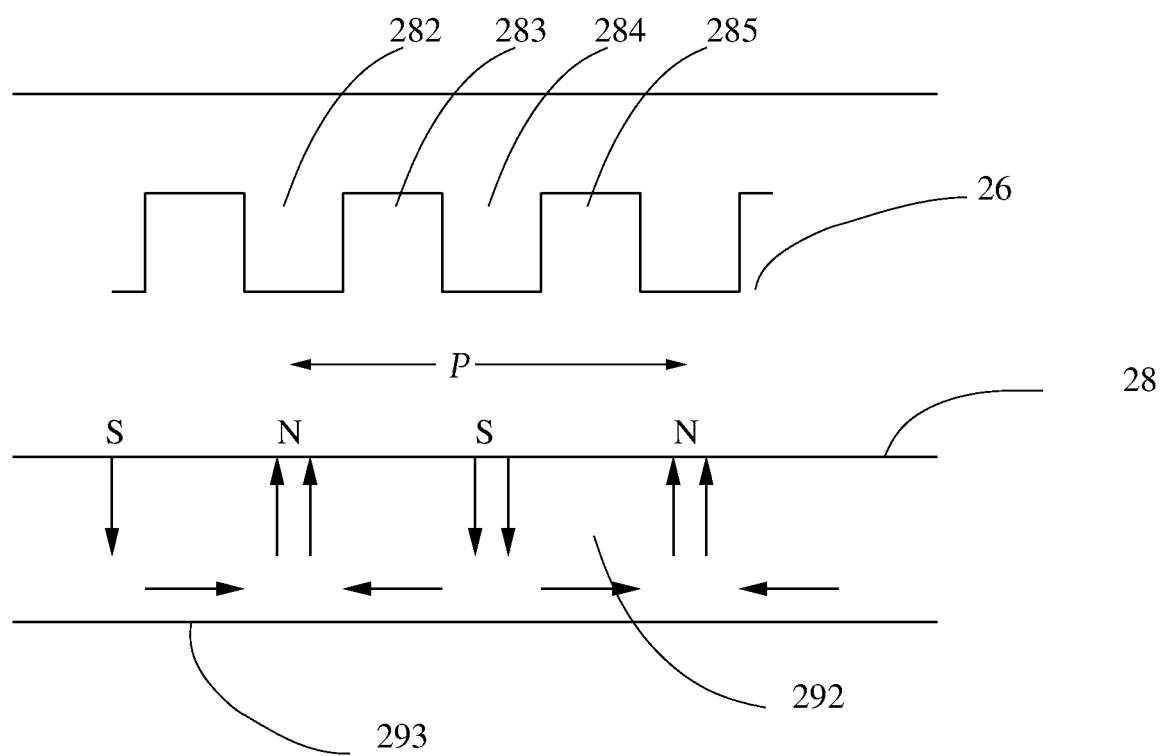
FIG. 11 shows a third alternative arrangement of ferromagnetic salient poles and magnets on the first and second bearing surfaces in the machine of FIG. 5.

In this case, the arrangement of ferromagnetic salient poles and magnets on the surfaces 26, 28 has a pitch P equal to the width of two of the magnets as shown in FIG. 10, FIG. 11 shows a third possible arrangement of ferromagnetic salient poles and magnets on the surfaces 26, 28 of the first and second bearing surfaces. Again, it will be noted that the arrangements are shown here schematically as if the two surfaces are planar, rather than circular.

In FIG. 11, the illustrated section of the surface 26 has ferromagnetic salient poles as shown at 282 and 284. Between the poles are non ferromagnetic slots 283 and 285.

The illustrated section of surface 28 has permanent magnet material 292 magnetized in such a way as to produce a succession of magnetic North and South poles at the surface 28 as shown and very little magnetic field on the surface 293, forming a structure known to a person skilled in the art as a Halbach array.

Again, the arrangement of ferromagnetic salient poles and magnets on the surfaces 26, 28 has a pitch P equal to the distance between two successive North poles, or between two successive South poles, as shown in FIG. 11.

Whether the ferromagnetic salient poles and magnets are as shown in FIG. 9, or as shown in FIG. 10, or as shown in FIG. 11, they produce a degree of coupling between the surfaces 26 and 28.

In any event, while there is described here an embodiment in which the ferromagnetic salient poles are on the surface 26, while the magnets are on the surface 28, the opposite arrangement would also be possible, with the ferromagnetic salient poles on the surface 28 and the magnets on the surface 26.

It is also possible to produce the magnetic field at surfaces 26 or 28 by using conventional electrical machine windings instead of magnets. The coupling with the ferromagnetic salient poles may be enhanced by using a conventional electrical machine winding round each ferromagnetic salient pole.

If conventional electrical machine windings are used, it is readily possible for a person skilled in the art to create an actively controlled bearing in which the forces between the parts are varied by varying the current in the windings as required.

Figure 12:
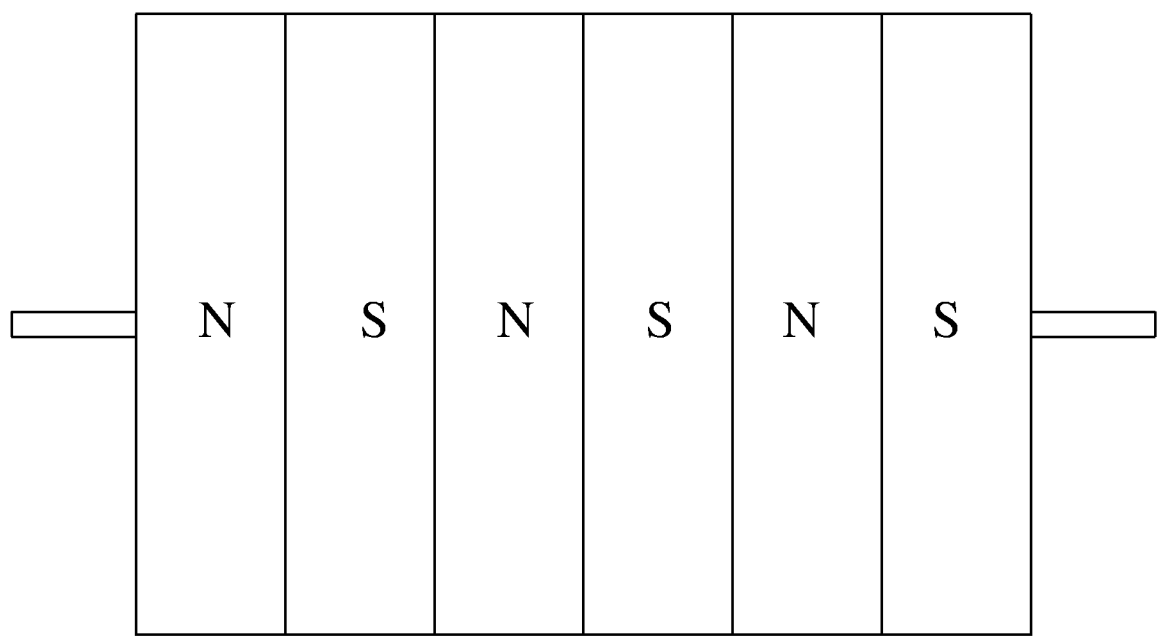
FIG. 12 shows another aspect of the arrangement of magnets for the shear type bearing shown in FIG. 5.

FIG. 12 shows in more detail the arrangements of the magnets or salient poles on the surfaces 26, 28. Specifically, the magnets or poles are arranged in cylindrical patterns. Axial displacements of the spinning support structure will result in a restoring force being produced by the magnetic arrangements on surfaces 26 and 28.

Figure 13:
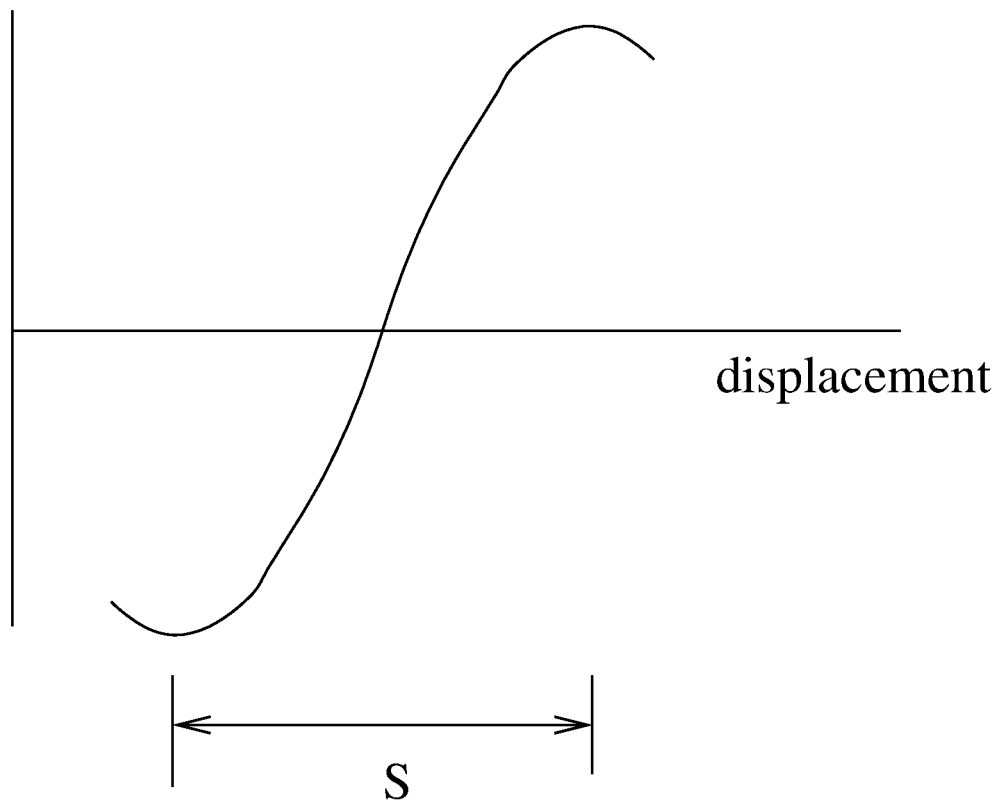
FIG. 13 illustrates the variation of force with displacement in a bearing as illustrated.

The shape of the restoring force versus displacement depends on the exact detail of the design but is often approximately sinusoidal as shown in FIG. 13.

The distance S as shown on FIG. 13 depends on the exact detail of the design. However, in the case of the arrangements shown in FIG. 6, FIG. 7 and FIG. 8, S is approximately equal to P/2, where P is labelled on FIG. 6, FIG. 7 and FIG. 8, while, in the case of the arrangements shown in FIG. 9, FIG. 10 and FIG. 11, S is approximately equal to P/4, where P is labelled on FIG. 9, FIG. 10 and FIG. 11.

The restoring force versus displacement characteristic illustrated in FIG. 13 is advantageous as it is clear that surfaces 26 and 28 exhibit stable equilibrium with respect to displacement within the range labelled S on FIG. 13. This means that a passive system is easily realised, although of course more expensive active magnetic bearings based on the shear force principles described here can readily be devised by one skilled in the art. The more common magnetic bearing system illustrated schematically in FIG. 14, based on attractive magnetic forces, is less advantageous as a passive system.

Figure 14:
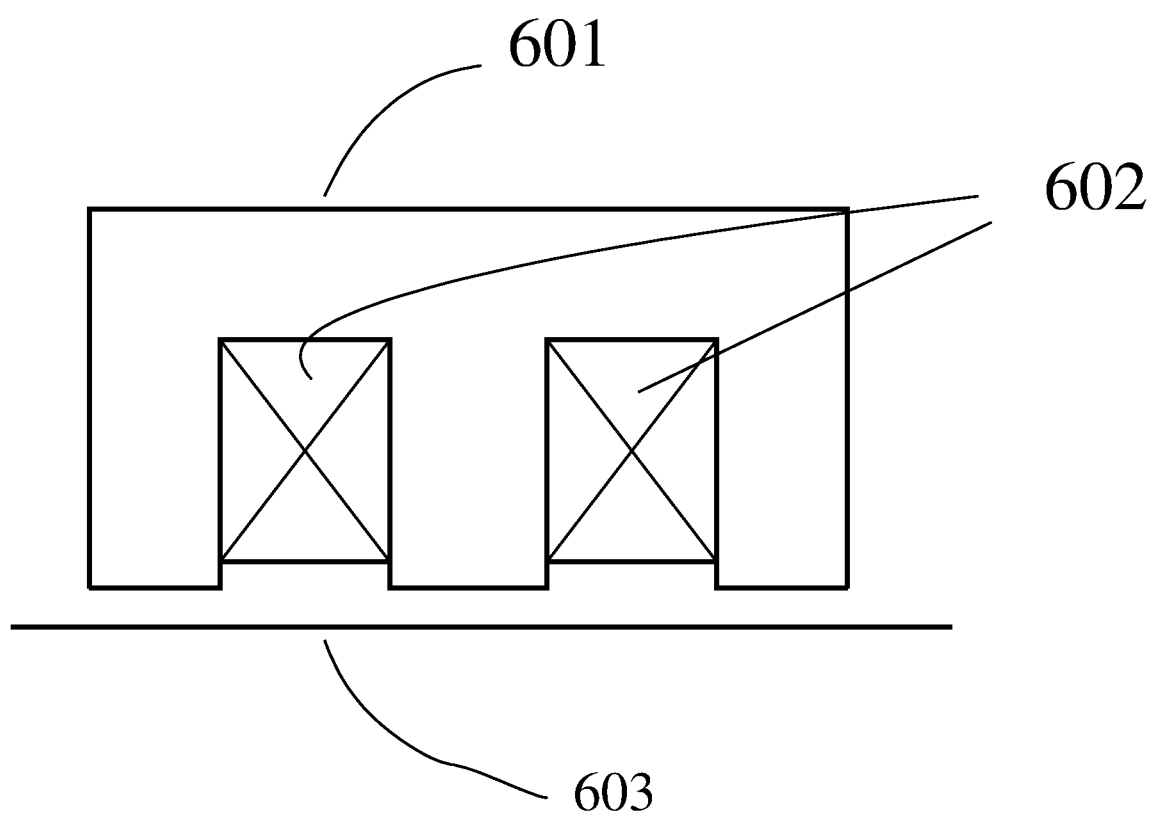
FIG. 14 is a schematic diagram, illustrating a conventional attraction type of magnetic bearing.

FIG. 14 illustrates the principle used in a typical state of the art attractive force magnetic bearing. A ferromagnetic yoke 601 surrounds a winding 602 carrying electrical current such that magnetic force attracts the yoke 601 and a second ferromagnetic surface 603 towards each other. The force produced is generally normal to the surface 603, rather than in a tangential (shear) direction as in the systems illustrated in FIGS. 6, 7, 8, 9, 10, 11. In a passive system the magnetic field is provided by constant electrical current in the winding 602 or by a system of permanent magnets. The normal force increases as the gap between 601 and 603 closes, so that there is no passive stable equilibrium condition. In an active bearing system the current in the winding 602 is controlled so as to produce a varying normal force as required.

Figure 15:
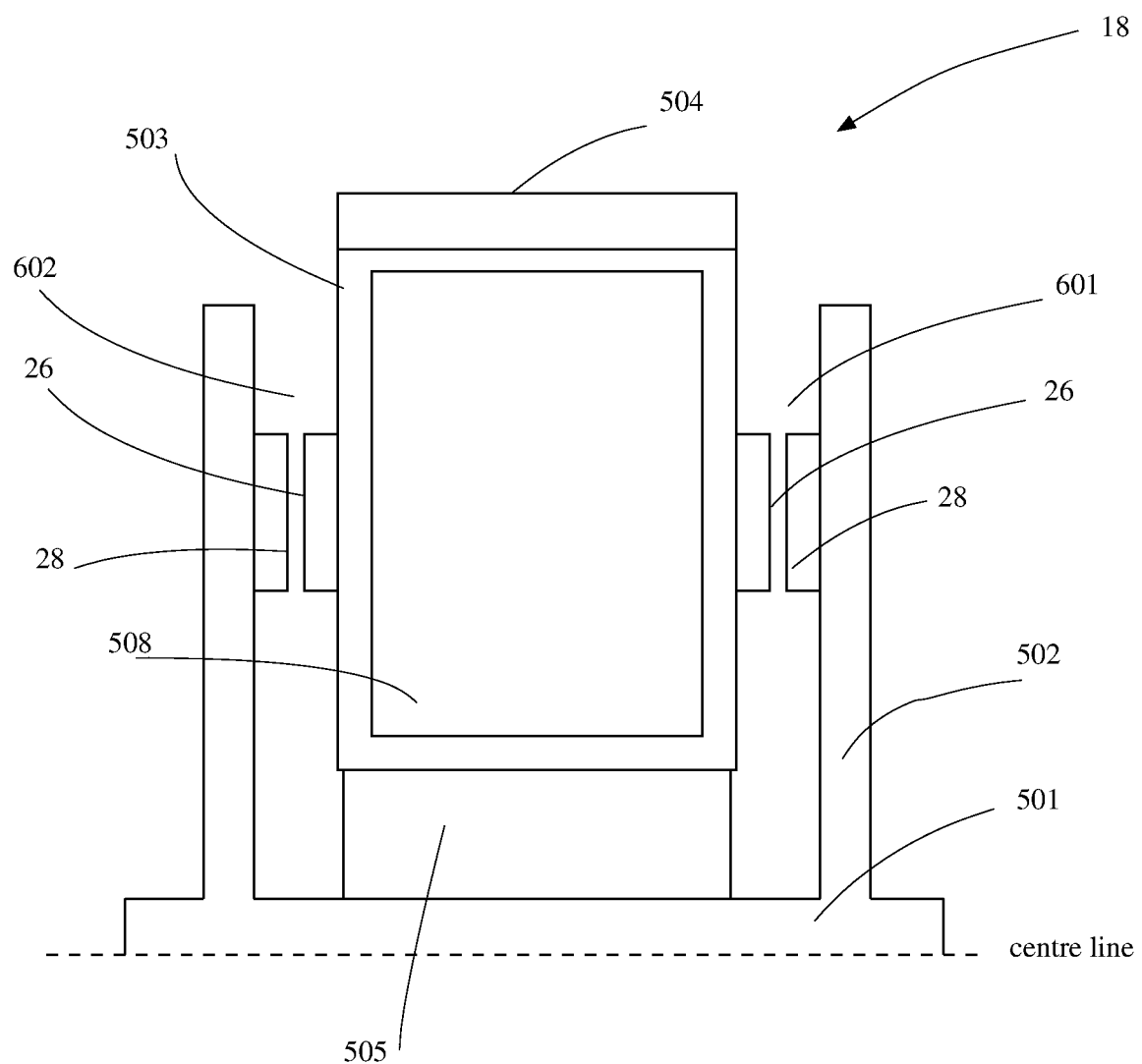
FIG. 15 is an alternative cross-sectional view through the part shown in FIG. 1.

FIG. 15 is a schematic diagram showing how a repulsion force magnetic bearing system can be used to offset the axial force on rotor 18.

The DSM system described in FIG. 6, FIG. 7 and FIG. 8 can also be used to provide a repulsion force magnetic bearing system.

For the purpose of illustration only, FIG. 15 shows a cross section through the rotor 18. The invention however allows other similar arrangements. Shaft 501 is constrained to be stationary by a support structure not shown here. Stationary flanges 502 are joined to the shaft 501. The magnet support structure 503 rotates on the shaft 501 carried on bearings 505. The helical magnets (DSM) or helical salient poles, (MR), at surface 504 are arranged on the outside diameter of 503. Mounted on the flange 502 at position 601 and 602 are the magnetic thrust bearings, of which more below. The bearings 505, which may be any previously described bearings such as mechanical rolling element bearings, mechanical plain bearings, active magnetic bearings or fluid bearings are arranged so as to allow a small amount of movement in the axial direction of rotor 18, but so as to constrain the structure 503 within industrially acceptable tolerances in other directions. The space shown as 508 contains the internal electric motor or generator as previously described (EP-A-2335344 and PCT/GB2012/053143).

The axial force A18 acts on the support structure 503 as a result of electromagnetic interactions between the magnetic structure 504 and the corresponding magnetic arrangement on the torpid 10, as previously described in patent applications (EP-A-2335344 and PCT/GB2012/053143). The magnetic bearings at positions 601 and 602 are arranged so that a magnetic repulsion force appears between the surfaces 26 and 28.

The repulsion force between surfaces 26 and 28 becomes larger as the gap between surfaces 26 and 28 becomes smaller. In the absence of any axial force A18, the gaps between surfaces 26 and 28 in the bearings 601 and 602 will be substantially similar. When an axial force A18 is applied, the gap between surfaces 26 and 28 of bearing 601 or 602 closes and the repulsion force becomes greater, in opposition to the axial force A18 so that a passive stable equilibrium position can be attained. Some or all of the axial force A18 appears across the magnetic thrust bearings at positions such as 601 or 602, so as to reduce or remove substantially all of the axial force on the bearings 505.

The magnetic thrust bearings shown at positions 601 and 602 comprise a first annular surface 26 attached to the spinning support structure 503 and a second annular surface 28 attached to the stationary part 502. Provided on surfaces 26 and 28 are arrangements of magnets configured so that 503 can rotate about 501 easily but can move in the axial direction of rotor 18 only within small limits determined by design.

The arrangements of magnets on surfaces 26 and 28 are exactly like those arrangements already described in FIG. 6, FIG. 7 and FIG. 8. In order to obtain a magnet system which produces repulsion between surfaces 26 and 28, it is only necessary to ensure that like poles oppose each other on surfaces 26 and 28, a north pole faces a north pole and a south pole faces a south pole, for instance FIG. 7 and FIG. 8 illustrate the position for maximum repulsion. On FIG. 6, FIG. 7 and FIG. 8 it will be noted that the arrangements are shown here schematically as if the two surfaces are planar, rather than circular.

It is also possible to produce the magnetic field at surfaces 26 or 28 by using conventional or superconducting electrical machine windings.

If conventional electrical machine windings are used, it is readily possible for a person skilled in the art to create an actively controlled bearing in which the forces between the parts are varied by varying the current in the windings as required.

Figure 16:
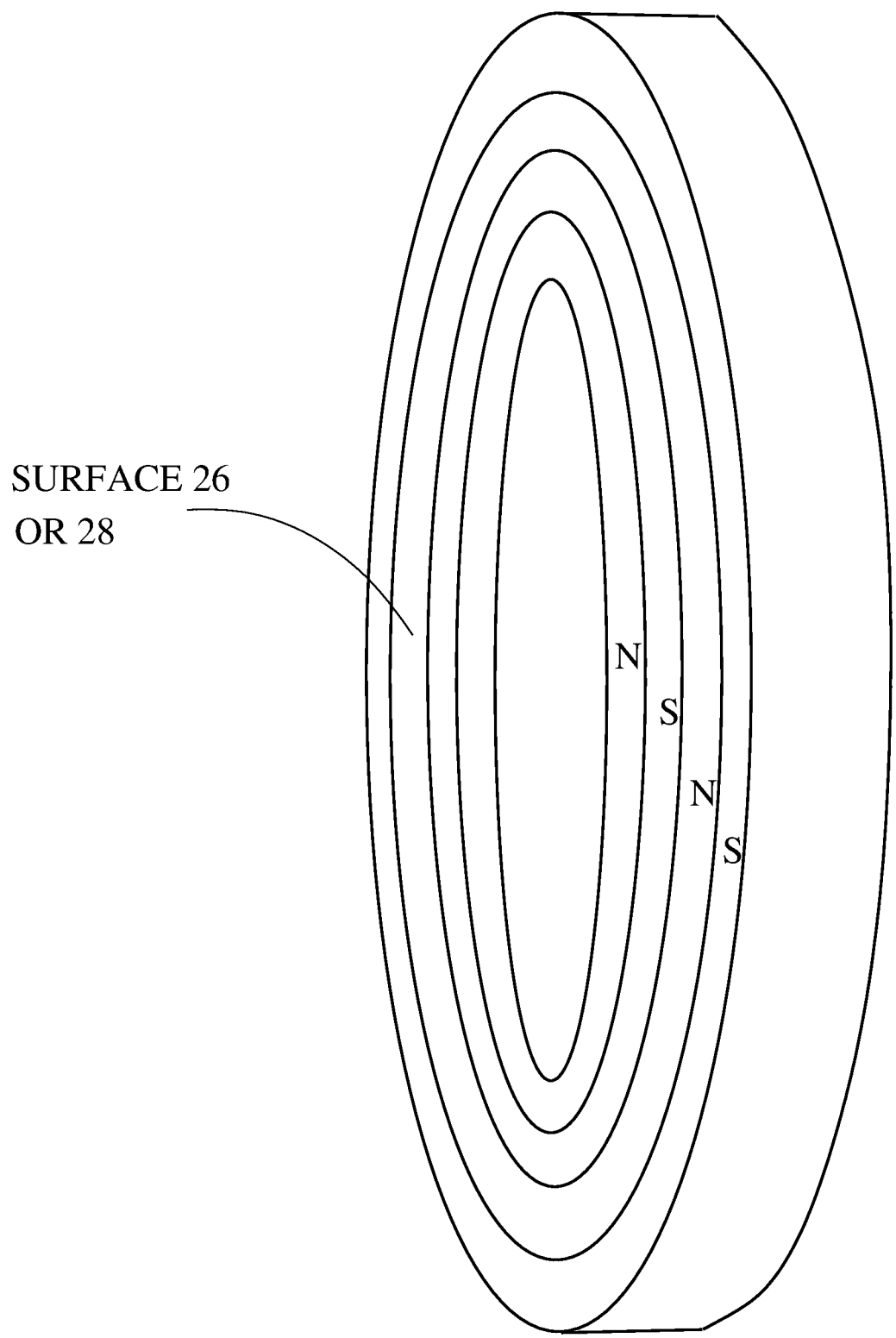
FIG. 16 shows another aspect of the repulsion type magnetic bearing shown in FIG. 15.

FIG. 16 shows in more detail the arrangements of the magnets on the surfaces 26, 28 for a repulsive bearing system. Specifically, the magnets are arranged in annular patterns. Axial displacements of the spinning support structure will result in a restoring force being produced by the magnetic arrangements at positions 601 and 602.

There is thus described a magnetic drive system in which a magnetic bearing is provided to reduce axial forces acting on the components.

The invention claimed is:

1. A magnetic drive, comprising:
   a prime mover, having a first helical magnet array on a first surface thereof;
   a rotor, having a second helical magnet array on an outer surface thereof, the outer surface of the rotor being located adjacent to the first surface of the prime mover such that movement of the prime mover causes rotation of the rotor about an axis of rotation;
   a support member, having a stationary shaft for defining the axis of rotation of the rotor, having a stationary flange joined to the shaft, and having a third magnet array on the stationary flange;
   wherein the third magnet array extends parallel to the axis of rotation of the rotor;
   wherein the rotor carries a fourth magnet array, and wherein the fourth magnet array extends parallel to the axis of rotation of the rotor; and
   wherein the third magnet array cooperates with the fourth magnet array to form a magnetic bearing to resist forces on the rotor acting along the axis of rotation thereof.

2. A magnetic drive as claimed in claim 1, wherein the rotor is a rotor of an electrical machine, further comprising a stator of the electrical machine.

3. A magnetic drive as claimed in claim 2, wherein the electrical machine is a motor.

4. A magnetic drive as claimed in claim 2, wherein the electrical machine is a generator.

5. A magnetic drive as claimed in claim 2, wherein the stator is mounted inside the rotor.

6. A magnetic drive as claimed in claim 1, wherein the rotor is supported on the shaft by bearings in addition to the magnetic bearing.

7. A magnetic drive as claimed in claim 6, wherein the additional bearings comprise mechanical bearings.

8. A magnetic drive as claimed in claim 6, wherein the additional bearings comprise fluid bearings.

9. A magnetic drive as claimed in claim 6, wherein the additional bearings comprise active magnetic bearings.

10. A magnetic drive as claimed in claim 1, wherein the third magnet array cooperates with the fourth magnet array on the rotor to form a passive magnetic bearing.

11. A magnetic drive as claimed in claim 1, wherein the third magnet array cooperates with the fourth magnet array on the rotor to form an active magnetic bearing.

12. A magnetic drive as claimed in claim 1, wherein the third magnet array and the fourth magnet array each extend parallel to the axis of rotation of the rotor, such that the magnetic bearing resists forces acting along the axis of rotation.

13. A magnetic drive as claimed in claim 12, wherein the fourth magnet array is arranged on an internal surface of the rotor.

14. A magnetic drive as claimed in claim 13, wherein the fourth magnet array is arranged on a radially outward internal surface of the rotor.

15. A magnetic drive as claimed in claim 13, wherein the fourth magnet array is arranged on a radially inward internal surface of the rotor.

16. A magnetic drive as claimed in claim 1, wherein the prime mover and the rotor are arranged such that said movement of the prime mover that causes rotation of the rotor about an axis of rotation comprises movement of the first surface of the prime mover relative to the outer surface of the rotor, in a direction parallel to said axis of rotation.

* * * * *